United States Patent

Wünsch et al.

[11] Patent Number: 5,922,469
[45] Date of Patent: Jul. 13, 1999

[54] MATERIALS SUITABLE AS CROSSLINKABLE BINDER COMPONENTS

[75] Inventors: Thomas Wünsch, Speyer; Gregor Brodt, Heppenheim; Ria Kress, Ludwigshafen; Norbert Schneider, Altrip; Albert Kohl, Laumersheim; August Lehner, Rödersheim-Gronau; Werner Balz, Limburgerhof, all of Germany

[73] Assignee: BASF Aktiengesellschaft, Ludwigshafen, Germany

[21] Appl. No.: 08/839,703

[22] Filed: Apr. 15, 1997

Related U.S. Application Data

[62] Division of application No. 08/370,984, Jan. 10, 1995, abandoned.

[30] Foreign Application Priority Data

Jan. 12, 1994 [DE] Germany ............... 44 00 596

[51] Int. Cl.⁶ ..................................... B32B 27/40
[52] U.S. Cl. ................. 428/425.9; 428/694 BL; 428/900
[58] Field of Search .................. 528/59, 60, 79; 252/182.26; 525/457; 428/900, 425.9, 694 BL

[56] References Cited

U.S. PATENT DOCUMENTS 4,988,574  1/1991  Murphy et al. .................. 428/694
5,082,737  1/1992  Bobrich et al. .................. 428/694

*Primary Examiner*—Rachel Gorr
*Attorney, Agent, or Firm*—Keil & Weinkauf

[57] ABSTRACT

Preparation of materials (I) having an average molecular weight from 4000 to 30,000, obtainable by reacting 1) a polyurethane (II) comprising
   a) 1 mol of a diol (III) having an average molecular weight of from 400 to 4000,
   b) from 0.3 to 9 mol of an aliphatic or cycloaliphatic diol (IV) of 2 to 18 carbon atoms,
   c) from 0.3 to 9 mol of an aromatic diol (V) of 8 to 30 carbon atoms,
   d) from 0.01 to 1 mol of a trihydric alcohol (VI) of 3 to 18 carbon atoms,
   e) from 0.001 to 1 mol of a polyhydric alcohol (VII) of 3 to 14 carbon atoms which contains a tertiary amino group and
   f) an amount of a diisocyanate (VIII) of 6 to 30 carbon atoms such that the molar ratio of the isocyanate groups to the total number of hydroxyl groups in (III) to (VII) is from 1.05:1 to 1.4:1 with 2) a compound (IX) which contains one or more hydroxyl groups and one or more amino groups reactive toward isocyanate groups, the amount of (IX) being such that the number of reactive amino groups corresponds to the number of isocyanate groups in the polyurethane (II).

The materials may be used as crosslinkable binder components for pigment-containing coatings, in particular for the production of magnetic recording materials.

3 Claims, No Drawings

MATERIALS SUITABLE AS CROSSLINKABLE BINDER COMPONENTS

This is a Division of application Ser. No. 08/370,984, filed Jan. 10, 1995, now abandoned.

The present invention relates to materials (I) suitable as crosslinkable binder components for pigment-containing coatings and having an average molecular weight from 4000 to 30,000, obtainable by reacting 1) a polyurethane (II) comprising
   a) 1 mol of a diol (III) having an average molecular weight of from 400 to 4000,
   b) from 0.3 to 9 mol of an aliphatic or cycloaliphatic diol (IV) of 2 to 18 carbon atoms,
   c) from 0.3 to 9 mol of an aromatic diol (V) of 8 to 30 carbon atoms,
   d) from 0.01 to 1 mol of a trihydric alcohol (VI) of 3 to 18 carbon atoms,
   e) from 0.001 to 1 mol of a polyhydric alcohol (VII) of 3 to 14 carbon atoms which contains a tertiary amino group and
   f) an amount of a diisocyanate (VIII) of 6 to 30 carbon atoms such that the molar ratio of the isocyanate groups to the total number of hydroxyl groups in (III) to (VII) is from 1.05:1 to 1.4:1 with 2) a compound (IX) which contains one or more hydroxyl groups and one or more amino groups reactive toward isocyanate groups, the amount of (IX) being such that the number of reactive amino groups corresponds to the number of isocyanate groups in the polyurethane (II).

With the introduction of modern audio and video recording and playback apparatuses, the magnetic tapes used are having to meet increasing and, in some cases, also contradictory requirements. This also applies to the present generation of data processing apparatuses using magnetic storage. On the one hand, the mechanical properties have to meet high requirements. On the other hand, particularly in the case of the new high-density recording systems the requirements which both the pigment and the magnetic layer have to meet have increased enormously. The magnetic properties, for example packing density, residual induction or switching field distribution, as well as effects such as surface quality and running characteristics of the resulting tapes, may be mentioned in particular here.

Improved binders are therefore required for the development of novel formulations. Other requirements such as stability to hydrolysis, low eluate level and little abrasion are additional general conditions. The functions are essentially introduced into the magnetic layer by the binder. Many polyurethanes and polyurethane elastomers which are suitable for the production of magnetic recording media are described in the patent literature, for example in DE-B 11 06 959, DE-B 25 00 921, DE-B 24 42 763 and DE-B 27 53 693.

DE-A 32 27 164 describes a magnetic recording medium which consists of a nonmagnetic substrate and at least one magnetic layer which is firmly applied thereon and is based on a magnetic material finely distributed in a binder consisting of at least 50% by weight of a thermoplastic polyurethane. The thermoplastic polyurethane is an isocyanate-free, branched polyurethane which is soluble in tetrahydrofuran and has OH-containing urea groups at the chain ends, a number average molecular weight of from 1 000 to 40 000 and an OH number of from 10 to 120. DE-A 39 29 165 describes the incorporation of an organofunctional polysiloxane compound in an abovementioned thermoplastic polyurethane which has improved frictional properties.

However, these binders have certain disadvantages, which are evident in particular in the industrial production of magnetic recording media. Thus, the rate of crosslinking with a polyisocyanate is too slow for the modern high-speed coating machines and leads to adhesion of the resulting tapes, particularly on calender rolls.

In the modern, economical coating technology, film blocks having a length of up to 40 000 m are coated at a casting speed of from about 300 to 750 m/min. At these speeds, the freshly coated tape has a residence time of from <1 to 10 seconds in the dryer. To avoid problems during coating and calendering (for example, the coated webs may flutter or run incorrectly in the dryer or calender), winding is carried out at high tension. This results in a pressure profile in the wound tapes. There is only a low pressure in the outer layers whereas the interior is subjected to a high pressure which may be up to several $t/cm^2$.

Another problem relates to the achievable final hardness of the magnetic layer, which has a decisive effect on the mechanical properties of the tape. In many cases, the level of hardness obtained with the above binders is insufficient. The incorporation of silicon compounds further enhances this effect.

Presumably, this component acts as a plasticizer in the polymer.

However, if the magnetic layers are too soft or cure too slowly, tapes having very different performance characteristics are formed. Owing to the different subsequent compaction in the block, the tapes become increasingly smooth toward the center of the block, and the porosity decreases. The desired tapes having good running behavior and the required magnetic properties are formed on the outside, whereas excessively smooth tapes which tend to block and may have altered magnetic properties are formed on the inside.

This may lead to nonuniform, off-spec productions.

It is an object of the present invention to provide binders which have improved mechanical properties, such as tensile strength, hardness, abrasion resistance and resilience and a high crosslinking rate.

We have found that this object is achieved by the material defined at the outset, processes for the preparation of the materials, processes for the production of pigment-containing coatings with these materials, their use as binder components for pigment-containing coatings, articles containing such coatings and magnetic recording materials containing these materials as binder components.

If necessary, from 0.001 to 0.4 mol of an organofunctional polysiloxane compound having two terminal groups reactive toward isocyanates and a molecular weight of from 300 to 4 000 may also be added to the binder.

In order to obtain special properties, it is advantageous if the polymer has an OH number of from 20 to 80, preferably from 20 to 60. The molecular weight is from 4 000 to 30 000, corresponding to a K value (1% strength in DMF) of from 20 to 45. In the composition of these polymers, it has proven advantageous that some of the terminal OH groups, preferably more than 80%, in particular more than 90%, are present in one of the following radicals:

—NH—CO—NR'—R—OH,

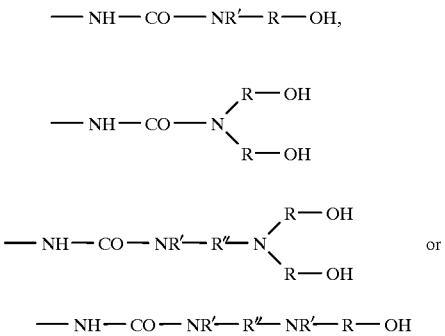

—NH—CO—NR'—R"—NR'—R—OH where
R is —(CH$_2$)$_n$—,
R' is —H, —CH$_3$ or —(CH$_2$)$_n$—CH$_3$ and

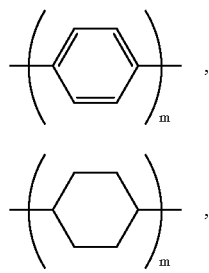

having from 0 to 2 C$_1$–C$_4$-alkyl radicals in the nucleus,
m is from 1 to 5
n is from 1 to 10.

Polymers having this composition have improved adhesive strength compared with those without these terminal groups. Furthermore, this also makes it possible to increase the content of terminal OH groups, with the result that, on crosslinking with polyisocyanate, the degree of crosslinking can be varied within wide limits, in accordance with the requirements for the magnetic layer. The urea groups, which enhance the mechanical properties of the layer and improve the adhesive strength, are al so advantageous.

The advantageous properties of the magnetic recording media having the compositions according to the invention, in comparison with the magnetic recording media obtained using the conventional thermoplastic polyurethane elastomers, are also evident if a polyisocyanate is added before application of the dispersion to the substrate. A large number of organic di-, tri- or polyisocyanates or isocyanate prepolymers having a molecular weight of up to 10 000, preferably from 500 to 3 000, can be used for the crosslinking. Polyisocyanates or isocyanate prepolymers which carry more than 2 NCO groups per molecule are preferred. Polyisocyanates based on toluylene diisocyanate, hexamethylene diisocyanate or isophorone diisocyanate, which are formed by poly- addition with di- or triols or by biuret and isocyanurate formation, have proven particularly suitable. An adduct of toluylene diisocyanate with trimethylolpropane and diethylene glycol is particularly advantageous.

Depending on the requirements which the recording material has to meet, the amount of added polyisocyanate component may be up to 70%, preferably up to 50%, less than the stoichiometric amount or in excess by up to 100%, p referably up to 50%, based on the OH groups of the polyurethane binder to be crosslinked.

For the preparation of the polyurethanes, a polydiol having a molecular weight of from 400 to 4 000, preferably from 700 to 2 500, is used as component A. The known polyesterols, polyetherols, polycarbonatediols and polycaprolactonediols are suitable for this purpose.

The polyesterols are advantageously predominantly linear polymers having terminal OH groups, preferably those having 2 terminal OH groups. The acid number of the polyesterols is less than 10, preferably less than 3. The polyesterols can be prepared in a simple manner by esterification of aliphatic and/or aromatic dicarboxylic acids of 4 to 15, preferably 4 to 6, carbon atoms with glycols, preferably glycols of 2 to 25 carbon atoms, or by polymerization of lactones of 3 to 20 carbon atoms. The dicarboxylic acids which may be used are, for example, glutaric acid, pimelic acid, suberic acid, sebacic acid, dodecanoic acid and preferably adipic acid, succinic acid and phthalic acids. The dicarboxylic acids may be used individually or as mixtures. For the preparation of the polyesterols, it may be advantageous to use the corresponding acid derivatives, such as anhydrides or acyl chlorides, instead of the dicarboxylic acids. Suitable aromatic dicarboxylic acids are terephthalic acid, isophthalic acid or mixtures of these with other dicarboxylic acids, eg. diphenic acid, sebacic acid, succinic acid and adipic acid. Examples of suitable glycols are diethylene glycol, 1,5-pentanediol, 1,10-decanediol and 2,2,4-trimethyl-1,5-pentanediol. 1,2-Ethane-diol, 1,4-butanediol, 1,6-hexanediol, 2,2-dimethyl-1,3-pro panediol, 1,4-dimethylolcyclohexane, 1,4-diethanolcylohexane and ethoxylated/propoxylated products of 2,2-bis-(4-hydroxyphenylene)-propane (bisphenol A) are preferably used. Depending on the desired properties of the polyurethanes, the polyols may be used alone or as a mixture in various ratios. For example, α,α-dimethyl-β-propiolactone, γ-butyrolactone and preferably ε-caprolactone are suitable as lactones for the preparation of the polyesterols.

The polyetherols are essentially linear substances which are terminal hydroxyl groups, contain ether bonds and have a molecular weight of from about 500 to 4 000, preferably from 1 000 to 2 000. Suitable polyetherols can be readily prepared by polymerization of cyclic ethers, such as tetrahydrofuran, or by reaction of one or more alkylene oxides where the alkylene radical is of 2 to 4 carbon atoms with an initiator molecule which contains two bound active hydrogen atoms in the alkylene radical. Examples of alkylene oxides are ethylene oxide, 1,2-propylene oxide, epichlorohydrin and 1,2- and 2,3-butylene oxide. The alkylene oxides may be used individually, alternately or as a mixture. Examples of suitable initiator molecules are water, glycols, such as ethylene glycol, propylene glycol, 1,4-butanediol and 1,6-hexane-diol, amines, such as ethylenediamine, hexamethylenediamine and 4,4'-diaminodiphenylmethane, and aminoalcohols, such as ethanolamine. As in the case of the polyesterols, the polyetherols, too, may be used alone or as mixtures.

The polycarbonate diols and their preparation are described in U.S. Pat. No. 4,131,731, and they are generally based on 1,6-hexanediol. Polyethercarbonatediols, for example those based on polytetrahydrofuran, are also possible.

Diols of 2 to 20, preferably 2 to 10, carbon atoms, eg. 1,2-ethanediol, 1,3-propanediol, 1,4-butanediol, 1,6-hexanediol, 1,5-pentanediol, 1,10-decanediol, 2-methyl-1,3-propanediol, 2-methyl-2-butyl-1,3-propanediol, 2,2-dimethyl-1,4-butanediol, 2-methyl-2-butyl-1,3-propanediol, neopentylglycol hydroxy-pivalate, diethylene glycol, triethylene glycol and methyldiethanolamine, may be used as building block B. The diols are used individually or as mixtures. It is also possible to use minor amounts of diamines of 2 to 15 carbon atoms, such as ethylenediamine, 1,6-hexamethylenediamine, 4,9-dioxododecane-1,12-diamine or 4,4'-diaminodiphenylmethane, or aminoalcohols, eg. monoethanolamine, monoisopropanolamine and 2-amino-2-methylpentan-2-ol. It has proven advantageous to incorporate the resulting urea groups in the polymer chain. The urea groups at the chain end are of minor importance here.

The stated diols, as building blocks B, may also be completely or partially replaced by water.

Diols of 2 to 30, preferably 2 to 24, carbon atoms which carry aromatic structures, eg. bisphenol A, doubly symmetrically ethoxylated bisphenol A, doubly symmetrically propoxylated bisphenol A, more highly ethoxylated or propoxylated bisphenol A derivatives or corresponding bisphenol F derivatives, are used as building blocks C. The diols may be used individually or as mixtures.

The triols for component D are compounds of 3 to 18, preferably 3 to 6, carbon atoms. Examples of corresponding triols are glycerol, trimethyloipropane and triethanolamine. Low molecular weight reaction products of, for example, trimethylolpropane with ethylene oxide and/or propylene oxide are also suitable. The presence of triols in the polyaddition leads to branching of the end product, which, if no local crosslinking occurs, has an advantageous effect on the mechanical properties of the polyurethane.

Component D comprises tertiary aminoalcohols of 3 to 40, preferably 3 to 24, carbon atoms, which carry at least two OH groups, eg. methyldiethanolamine, ethyldiethanolamine, propyldiethanolamine, methyldipropanolamine, ethyldipropanolamine, propyldipropanolamine, triethanolamine or tripropanolamine. Methyldiethanolamine and ethyldiethanolamine have proven particularly advantageous.

The organofunctional polysiloxane compounds which may be used are polysiloxanediols, polysiloxanedicarboxylic acids or ε-hydroxy-polysiloxanecarboxylic acids or ε-hydroxypolysiloxaneamines. These products may be used either individually or in combination. Owing to the good handling characteristics due to the solubility in the corresponding solvents, polysiloxanediols a re preferred.

Such silicone oils having terminal hydroxyalkyl groups bonded to the silicon have, for example, the following structure:

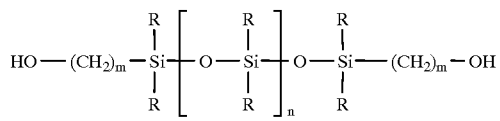

m=1 n=2–133

R=hydrocarbon radical of 1 to 20 carbon atoms.

Where R is $CH_3$, it is possible to use, for example, the Baysilon® grades from Bayer or Tego® OF-1010 or Tego® OF-1025 from Goldschmidt.

For the formation of the polyurethanes or NCO-containing intermediates, the components stated under A, B, C and D are reacted with aliphatic, cycloaliphatic or aromatic disocyanates of 6 to 30 carbon atoms (component F). Compounds such as toluylene 2,4-diisocyanate, toluylene 2,6-diisocyanate, m- and p-tetramethylxylene diisocyanate, m-phenylene diisocyanate, 4-chlorophenylene 1,3-diisocyanate, naphthylene 1,5-diisocyanate, hexamethylene 1,5-diisocyanate, hexamethylene 1,6-diisocyanate, cyclohexylene 1,4-diisocyanate and tetrahydronaphthylene 1,5-diisocyanate, diphenylmethane 4,4'-diisocyanate, dicyclohexylmethane diisocyanate, isophorone diisocyanate or mixtures thereof are suitable for this purpose.

For the formation of the OH-containing polyurethane urea elastomers, the NCO-containing intermediate from A to F is reacted with aminoalcohols (of 2 to 16 carbon atoms). These aminoalcohols of 2 to 16, preferably 3 to 6, carbon atoms include monoethanolamine, methylisopropanolamine, ethylisopropanolamine, methylethanolamine, 3-aminopropanol, 1-ethylaminobutan-2-ol, 4-methyl-4-aminopentan-2-ol and N-(2-hydroxyethyl)-aniline. Diol amines are particularly suitable since the number of OH groups in the polymers is doubled as a result of their addition at the chain end. Diethanolamine and diisopropanolamine have proven particularly advantageous (building block G).

The mixture of component A to component F may be varied from 1.7 to 31.5 mol of diisocyanate per mol of polydiol when from 0.3 to 9, preferably from 0.5 to 5, mol of the diol of 2 to 18 carbon atoms and from 0.01 to 1, preferably from 0.15 to 0.5, mol of triol are used, the amount of the diol used depending in part on the molecular weight of the polydiol used. The isocyanate used should be present in an amount which is from 5 to 35%, based on the amount of NH- or OH-containing compounds, less than the stoichiometric amount, so that, at the end of the reaction, virtually no free, unconverted isocyanate is present but free, unconverted hydroxyl groups remain. For practical reasons and reasons relating to coating technology, however, it is often advantageous to use a diisocyanate excess of from 5 to 40%, preferably from 10 to 30%, based on the amount required for complete conversion of the reactants, in the preliminary reaction of the components A to E, so that the ratio of the number of hydroxyl groups used to the number of isocyanate groups in this reaction stage is from about 1:1.05 to 1:1.4, preferably from about 1:1.1 to 1:1.30. In the second reaction stage, an NH-equivalent amount, corresponding to the NCO content, of component G, ie. from 0.05 to 4, preferably from 0.3 to 2.5, mol per mole of component A, is added, or the NCO prepolymer is added to the aminoalcohol so that the amino groups react with the isocyanate. If slightly less than the stoichiometric amount of NH or $NH_2$ groups relative to the NCO groups is available in this second reaction stage, some of the aminoalcohol is incorporated in the molecule and, depending on the aminoalcohol, results in a branching point. If an excess of NH groups is used, the aminoalcohol is completely incorporated in the polymer system only during the crosslinking reaction. Thus, by choosing, ie. varying, the terminal groups, it is possible to adapt the polymer to the particular requirements, such as the ability to form films or to disperse.

The thermoplastic, resilient OH-containing polyurethanes having said composition are prepared in solution by the 2-stage process, in the presence or absence of catalysts and other assistants and/or additives. It is not practical to prepare these products by the solvent-free batch process. Since at least partial formation of gel particles takes place owing to the presence of the triol and to the reaction of amine with NCO groups in the polyaddition in the absence of a solvent, the reaction is carried out in solution. In general, the danger of local overcrosslinking, as occurs in the polyaddition in the absence of a solvent, is avoided in the solution polyaddition.

Depending on the reaction conditions, ie. amount of solvent, heat of reaction and reactivity of the components, two different procedures are possible in the 2-stage process, which differ only in the first stage. Different procedures are described by way of example.

Procedure 1: The diisocyanate is initially taken with a little solvent, after which the building blocks A, B and C and, if required, the catalyst and the assistants and additives in solvents are added at from 20 to 90° C., preferably from 30 to 70° C., in the course of from 0.2 to 5 hours. The components are reacted until the desired NCO content is obtained, after which the stopping agent (component G) is added in the 2nd stage.

Procedure 2: In this process, the starting components A to F are dissolved in some of the solvent to give solutions having a solids content of from 15 to 50% by weight. Thereafter, the stirred solutions are heated to 20–90° C., preferably 30–70° C., if necessary after the addition of a catalyst. The components are then reacted until the desired NCO content is obtained, after which the stopping agent is added in the 2nd stage.

In the 2-stage process according to procedure 1 or 2, an excess of NCO, relative to building blocks A to E, is continuously employed in the first stage. In both procedures, it is possible to begin the reaction in some of the solvent and to add the remaining solvent during or after the reaction.

Cyclic ethers, such as tetrahydrofuran and dioxane, and cyclic ketones, such as cyclohexanone, are preferably used as solvents for the preparation of the polyurethanes. Depending on the field of use, the polyurethanes can of course also be prepared in other polar solvents, such as dimethylformamide, N-methylpyrrolidone, dimethyl sulfoxide or ethylglycol acetate. It is also possible to mix the stated solvents with aromatics, such as toluene or xylene, and esters, such as ethyl or butyl acetate.

Examples of suitable catalysts for the preparation of the polyurethanes and for the crosslinking reaction are tertiary amines, such as triethylamine, triethyleneamine, N-methylpyridine and N-methylmorpholine, metal salts, such as tin octoate, lead octoate and zinc stearate, and organometallic compounds, such as dibutyltin dilaurate. The suitable amount of catalyst depends on the activity of the relevant catalyst. In general, it has proven advantageous to use from 0.005 to 0.3, preferably from 0.01 to 0.1, part by weight by 100 parts by weight of polyurethane.

The polyurethanes used according to the invention may be employed as sole binders for the production of magnetic layers, but, for specific intended uses in the case of magnetic recording media according to the invention, it is advantageous to add a second binder component in amounts of from 5 to 70, preferably from 10 to 40, parts by weight, based on the resulting total amount of binder.

The physically drying binders present in the binder mixture are known. They include a polyvinylformal binder which was prepared by hydrolysis of a polymer of a vinyl ester and subsequent reaction of the vinyl alcohol polymer with formaldehyde. The polyvinylformals advantageously contain at least 65, in particular at least 80, % by weight of vinylformal groups. Suitable polyvinylformals contain from 5 to 13% by weight of vinyl alcohol groups and from 80 to 88% by weight of vinylformal groups and have a density of about 1.2 and a viscosity of from 50 to 120 mPas, measured at 20° C. using a solution of 5 g of polyvinylformal in 100 ml of 1:1 phenol/toluene. In addition to the polyvinylformal, vinyl chloride/diol mono- or di(meth)acrylate copolymers, which can be prepared, for example, in a conventional manner by solution copolymerization or suspension copolymerization of vinyl chloride and the diol monomethacrylate or monoacrylate, are also suitable. The diol mono- or diacrylate or mono- or dimethacrylate used for this purpose is an esterification product of acrylic acid or methacrylic acid with the corresponding molar amount of an aliphatic diol of 2 to 4 carbon atoms, such as ethylene glycol, 1,4-butanediol and, preferably, propanediol, the propanediol preferably consisting of 1,3-propanediol and from 0 to 50% by weight of 1,2-propanediol. The copolymers advantageously have a vinyl chloride content of from 50 to 95% by weight and a diol acrylate or methacrylate content of from 5 to 50% by weight. Particularly suitable copolymers preferably contain from 70 to 90% by weight of vinyl chloride and from 10 to 30% by weight of diol monoacrylate or diol monomethacrylate. A 15% strength solution of particularly suitable copolymers, such as vinyl chloride/propanediol monoacrylate copolymers, in a mixture of equal amounts by volume of tetrahydrofuran and dioxane has a viscosity of about 30 mPa.s at 25° C. The K value according to H. Fikentscher (Cellulosechemie 13 (1932), 58 et seq.) of the particularly suitable products is from 30 to 50, preferably about 40.

Phenoxy resins whose constitution may be described by means of the repeating units of the formula

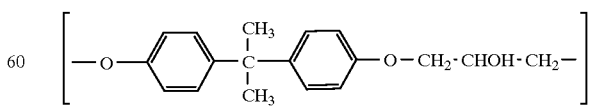

where n is about 100, may also advantageously be used. These are polymers such as those known under the tradenames Epikote® from Shell Chemical Co. or under the name Epoxy Resin PKHH® from Union Carbide Corporation.

It is also possible to use polyurethane elastomers which carry ionic groups, eg. sulfonate or phosphonate groups.

Cellulose ester binders are also suitable for use in the binder mixture described. These are esterification products of cellulose with nitric acid or with a carboxylic acid of 1 to 4 carbon atoms, eg. cellulose acetate, cellulose triacetate, cellulose acetopropionate or cellulose acetobutyrate.

It is particularly advantageous to employ the polyureaurethane binders used according to the invention in combination with polyurethaneurea (meth)acrylates, as described, for example, in DE-A-41 41 838. This makes it possible further to improve, in particular, the dispersion stability. In particular, polyurethaneurea (meth)acrylates which are prepared in tetrahydrofuran as a solvent and in which up to 40% by weight of the acrylates have 1 or 2 terminal tetrahydrofuran groups give good results.

The further processing of the binder mixture with magnetic materials and assistants to give the novel magnetic recording media is carried out in a manner known per se.

The pigments known per se, which substantially influence the properties of the resulting magnetic layers, eg. gamma-iron(III) oxide, finely divided magnetite, ferromagnetic undoped or doped chromium dioxide, cobalt-modified gamma-iron(III) oxide, barium ferrites or ferromagnetic metal particles, may be used as anisotropic magnetic materials. Acicular cobalt-modified or unmodified gamma-iron (III) oxide and ferromagnetic chromium dioxide and metal pigment are preferred. The particle size is in general from 0.1 to 2 μm, preferably from 0.15 to 0.8 μm.

In a manner known per se, the magnetic layers may furthermore contain additives, such as dispersants and, in minor amounts which are small compared with the prior art, also further lubricants as well as fillers, which are mixed in during the dispersing of the magnetic pigments or during the production of the magnetic layer.

The ratio of magnetic material to binder in the novel recording materials is from 1 to 10, in particular from 3 to 6, parts by weight of magnetic material to one part by weight of the binder mixture. The fact that, owing to the excellent pigment binding capacity of the special polyurethanes, high concentrations of magnetic material are possible in the magnetic layers without the mechanical and elastic properties being adversely effected or the performance characteristics markedly suffering is a particular advantage.

The conventional rigid or flexible substrates, in particular films of linear polyesters, such as polyethylene terephthalate, in general in thicknesses of from 4 to 200 μm, in particular from 6 to 36 μm, can be used as nonmagnetic and nonmagnetizable substrates. Recently, the use of the magnetic layers on paper substrates for electronic computing and accounting machines has also become important; the novel coating materials can advantageously be used for this purpose too.

The novel magnetic recording media can be produced in a known manner. Advantageously, the magnetic pigment dispersion prepared in a dispersing apparatus, for example a tubular ball mill or a stirred ball mill, from the magnetic material and a solution of the binder with the addition of lubricants and possibly small amounts of dispersants is filtered after the polyisocyanate crosslinking agent has been mixed in and is applied to the nonmagnetic substrate by means of a conventional coating apparatus, for example a knife coater. In order to obtain high electroacoustic and magnetic values in a relatively short dispersing time, it is advantageous to carry out the dispersing with component 1 and to stir in component 2 after the dispersing procedure. This process is suitable because the stated component 2 is readily compatible with component 1. As a rule, magnetic orientation is carrried out before the liquid coating mixture has dried on the substrate; the latter is advantageously carried out in the course of from 10 to 200 seconds at from 50 to 90° C. The magnetic layers can be calendered and compacted on conventional apparatuses by being passed between heated and polished rollers, if necessary with the application of pressure and at from 25 to 100° C., preferably from 60 to 90° C. In the case of crosslinking binders, it has proven very advantageous to carry out the calendering before the crosslinking is complete, since the OH polymers in the uncrosslinked state are very thermoplastic without being tacky. The thickness of the magnetic layer is in general from 0.5 to 20 μm, preferably from 1 to 10 μm. In the case of the production of magnetic tapes, the coated films are slit in the longitudinal direction into the conventional widths, generally specified in inches.

The novel magnetic recording media have substantially improved mechanical properties, which are expressed in particular by the layer hardness and the modulus of elasticity of the magnetic layer, compared with those which were obtained using polyurethane or polyurethane mixtures according to the prior art. Furthermore, the speed with which the final hardness is reached in the crosslinking reaction is considerably greater. These effects are also observed in the incorporation of polysiloxanes in the polymer chain for improving the frictional properties, which usually means a deterioration in the mechanical properties of the tape. It has furthermore been found that, when the novel polyurethanes are used, the gloss development during dispersing of the magnetic material increases substantially more rapidly than when polyurethane or polyurethane mixtures according to the prior art are used, which is surprising to a person skilled in the art. It was also possible to achieve lower eluate values compared with tapes containing conventional binders.

The examples which follow illustrate the invention.

In the examples and comparative examples, parts are by weight unless stated otherwise. Parts by volume bear the same relation to parts by weight as that of the liter to the kilogram.

EXAMPLE 1

0.5 g of dibutyltin dilaurate was added to a 60% strength by weight solution of 112.0 g of toluylene diisocyanate and 158.3 g of diphenylmethane 4,4'-diisocyanate in tetrahydrofuran, and the mixture was then heated to 60° C. At this temperature, a 60% strength by weight solution of 390 g of a polyesterol obtained from 1,4-butanediol and adipic acid and having a molecular weight of 1000, 167.5 g of a polyesterol obtained from 1,6-hexanediol, adipic acid and terephthalic acid, 29.4 g of polydimethylsiloxane having hydroxyl functional groups and a molecular weight of 900, 3.17 g of trimethylolpropane, 3.13 g of methyldiethanolamine, 72 g of diethoxylated bisphenol A and 27 g of 1,6-hexanediol in tetrahydrofuran was metered in over 2 hours.

After the end of the addition, the reaction mixture was stirred at 60° C until an NCO content of 0.92% by weight was reached. Thereafter, the reaction mixture was cooled to 40° C. and 36.7 g of diethanolamine were added.

This polyurethane solution was diluted with tetrahydrofuran until a 50% strength by weight solution of the polyurethane in tetrahydrofuran was obtained.

The polyurethane solution obtained had a viscosity of 797 mPa•s at 22° C.

The polyurethane had a number average molecular weight of 6 000, a Fikentscher K value of 27.3, a glass transition temperature of 6° C. and a hydroxyl number of 40.1 mg KOH/g.

COMPARATIVE EXAMPLE 1

0.5 g of dibutyltin dilaurate was added to a 60% strength by weight solution of 106.1 g of toluylene diisocyanate and 150.0 g of diphenylmethane 4,4'-diisocyanate in tetrahydrofuran, and the mixture was then heated to 60° C. At this temperature, a 60% strength by weight solution of 500 g of a polyesterol obtained from 1,4-butanediol and adipic acid and having a molecular weight of 1000, 2.68 g of trimethylolpropane and 55.5 g of hexanediol in tetrahydrofuran was metered in over 2 hours. After the end of the addition, the reaction mixture was stirred at 60° C. until an NCO content of 1.05% by weight was reached.

Thereafter, the reaction mixture was left to cool to 40° C. and 44.1 g of diethanolamine were added.

This polyurethane solution was diluted with tetrahydrofuran until a 50% strength by weight solution of the polyurethane in tetrahydrofuran was obtained.

The polyurethane solution obtained had a viscosity of 621 mPa•s at 22° C.

The polyurethane had a number average molecular weight of 4 292 g/mol, a Fikentscher K value of 27.7, a glass transition temperature of –7 ° C. and a hydroxyl number of 56.1 mg KOH/g.

EXAMPLE 2

0.5 g of dibutyltin dilaurate was added to a 60% strength by weight solution of 105 g of toluylene diisocyanate and 170.0 g of diphenylmethane 4,4'-diisocyanate in tetrahydrofuran, and the mixture was then heated to 60° C. At this temperature, a 60% strength by weight solution of 345 g of a polyesterol obtained from 1,4-butanediol and adipic acid and having a molecular weight of 1000, 1267.0 g of a polyesterol obtained from 1,6-hexanediol, adipic acid and terephthalic acid, 3.17 g of trimethylolpropane, 4.76 g of methyldiethanolamine, 72 g of diethoxylated bisphenol A and 25.1 g of 1,6-hexanediol in tetrahydrofuran was metered in over 2 hours.

After the end of the addition, the reaction mixture was stirred at 60° C. until an NCO content of 0.92% by weight was reached. Thereafter, the reaction mixture was allowed to cool to 40° C. and 36.7 g of diethanolamine were added.

This polyurethane solution was diluted with tetrahydrofuran until a 50% strength by weight solution of the polyurethane in tetrahydrofuran was obtained.

The polyurethane solution obtained had a viscosity of 925 mPa•s at 22° C.

The polyurethane had a number average molecular weight of 6 000, a Fikentscher K value of 28.2, a glass transition temperature of 8° C. and a hydroxyl number of 40.1 mg KOH/g.

COMPARATIVE EXAMPLE 2

The procedure was as in Example 2, except that the diethoxylated bisphenol A and the methyldiethanolamine were replaced with 23.4 g of 1,4-butanediol.

EXAMPLE 3

The procedure was as in Example 2, except that the methyldiethanolamine was replaced with 4.4 g of N-ethyl-N,N-diethanolamine.

EXAMPLE 4

17,482 parts of toluene were heated to the boil in a heatable reaction vessel having a capacity of 100,000 parts by volume and equipped with a stirrer and a reflux condenser, while continuously passing in air diluted with nitrogen. A mixture of 15,903 parts of methyl methacrylate, 15,903 parts of n-butyl methacrylate, 403 parts of mercaptoethanol and 80 parts of azobisisobutyronitrile was metered in over 2 hours. After stirring had been carried out for 30 minutes, a mixture of 132 parts of azobisisobutyronitrile and 257 parts of mercaptoethanol, dissolved in 1,532 parts of toluene, was added in the course of a further 2 hours. After 2 hours, a mixture of 3,384 parts of toluene, 24 parts of hexamethylene diisocyanate, 2,909 parts of the biuret of hexamethylene diisocyanate and 1,430 parts of a polyisocyanate having an average functionality of 4.8 was added in the course of 15 minutes. After stirring had been carried out for 30 minutes, 200 parts of dibutyltin dilaurate per 1,000,000 parts of the total amount were added. After 1 hour, gaseous ammonia is bubbled through the solution until no further temperature increase is observed. The excess ammonia is then removed by passing through nitrogen.

The polymer had a weight average molecular weight of 5000 and a Fikentscher K value of 23 (1% strength in DMF).

EXAMPLE 5

17,482 parts of tetrahydrofuran were heated to the boil in a heatable reaction vessel having a capacity of 100,000 parts by volume and equipped with a stirrer and a reflux condenser, while continuously passing in air diluted with nitrogen. A mixture of 15,903 parts of methyl methacrylate, 15,903 parts of n-butyl methacrylate, 403 parts of mercaptoethanol and 80 parts of azobisisobutyronitrile was metered in over 2 hours. After stirring had been carried out for 30 minutes, a mixture of 132 parts of azobisisobutyronitrile and 257 parts of mercaptoethanol, dissolved in 1,532 parts of tetrahydrofuran was added in the course of a further 2 hours. After 2 hours, a mixture of 3,384 parts of tetrahydrofuran, 24 parts of hexamethylene diisocyanate, 2,909 parts of the biuret of hexamethylene diisocyanate and 1,430 parts of a polyisocyanate having an average functionality of 4.8 was added in the course of 15 minutes. After stirring had been carried out for 30 minutes, 200 parts of dibutyltin dilaurate per 1,000,000 parts of the total amount were added. After 1 hour, gaseous ammonia is bubbled through the solution until no further temperature increase is observed. The excess ammonia is then removed by passing through nitrogen.

The polymer had a Fikentscher K value of 21.9 (1% strength in DMF).

EXAMPLE 6

100 parts by weight of a ferromagnetic chromium dioxide having a coercive force of 43 kA/m, a mean particle size of 0.5 μm and a length/width ratio of 4:1 were dispersed together with 7.3 parts by weight of a 55% strength solution of the polyurethaneurea methacrylate according to Example 4 in tetrahydrofuran, 8.7 parts by weight of a 50% strength solution according to Example 1, 0.6 part by weight of linseed oil fatty acid and 110 parts by weight of a mixture of tetrahydrofuran and dioxane in a weight ratio of 1:1 for 72 hours in a steel ball mill. Thereafter, a mixture of 18.5 parts by weight of a 50% strength solution according to Example 1, 38.5 parts by weight of a mixture of tetrahydrofuran and dioxane in a weight ratio of 1:1, 1.0 part by weight of linseed oil fatty acid and 0.5 part by weight of a dimethylsiloxane having a viscosity of 60 000 mPa•s was added to this premilled dispersion at 22° C., and dispersing was carried out for a further 2 hours. 4.8 parts by weight of a 50% strength solution of a triisocyanate, prepared by reacting 3 mol of toluylene diisocyanate with 1 mol of trimethylolpropane, in tetrahydrofuran were added to the dispersion thus obtained, and the mixture was vigorously stirred and then filtered through a filter having a pore size of 3 μm.

A 7.5 μm thick polyethylene phthalate film was coated with this dispersion by means of a knife coater, and, after passing through a magnetic field, the coating was dried at 80° C. The magnetic layer was compacted and calendered by being passed between heated rollers. The thickness of the resulting magnetic layer was 5 μm. The film coated in this manner was slit into tapes 3.81 mm wide.

EXAMPLE 6a

The procedure was as in Example 6, except that, instead of the polyurethaneurea methacrylate, the same amount by weight of a polyvinyl acetate having an OH number of 72 and a Fikentscher K value of 55 (1% strength in DMF) was used.

COMPARATIVE EXAMPLE 3

The procedure was as in Example 6, except that, instead of the polyurethane according to Example 1, one according to Comparative Example 1 was used.

EXAMPLE 7

100 parts by weight of a magnetic γ-iron(III) oxide having a coercive force of 29.2 kA/m and a specific surface area of 18.1 m²/g, 1 part by weight of a coarse α-iron(III) oxide having a specific surface area of 3 m²/g and a mean particle size of 0.93 μm, 7.3 parts by weight of a 55% strength solution of a polyurethaneurea methacrylate having terminal urea groups in toluene, according to Example 4, 0.5 part by weight of a 2-ethylhexylphosphoric acid, 8.7 parts by weight of a 50% strength polyurethane solution according to Example 1 and 110 parts by weight of a mixture of tetrahydrofuran and dioxane in a weight ratio of 1:1 were dispersed for 72 hours in a steel ball mill according to Example 3.

A mixture of 18.5 parts by weight of a 50% strength by weight solution according to Example 2, 38.3 parts by weight of a mixture of tetrahydrofuran and dioxane in a weight ratio of 1:1, 0.5 part by weight of isostearic acid, 0.3 part by weight of triethanolamine dioleate and 0.5 part by weight of a dimethylsiloxane having a viscosity of 60 000 mPa•s was then added to this premilled dispersion at 22° C. and dispersing was carried out for a further 2 hours.

4.8 parts by weight of a 50% strength by weight solution of a triisocyanate, obtained by reacting 3 mol of toluylene diisocyanate and 1 mol of trimethylolpropane, in tetrahydrofuran were added to the dispersion thus obtained, and the mixture was vigorously stirred and then filtered through a filter having a pore size of 3 μm.

The dispersion was then applied as a coating as described in Example 6.

COMPARATIVE EXAMPLE 4

The procedure was as in Example 7, except that, instead of the polyurethane from Example 1, the same amount of polyurethane from Comparative Example 1 was used.

EXAMPLE 8

The procedure was as in Example 6, except that, instead of the polyurethane according to Example 1, the same amount of polyurethane according to Example 2 was used and, instead of the polymer according to Example 4, the same amount of polymer according to Example 5 was employed.

EXAMPLE 9

The procedure was as in Example 8, except that, instead of the polyurethane according to Example 2, the same amount of polyurethane according to Example 3 was used.

COMPARATIVE EXAMPLE 5

The procedure was as in Example 8, except that, instead of the polyurethane according to Example 2, the same amount of polyurethane according to Comparative Example 2 was used.

Test 1
Tendency to stick after storage at elevated temperatures

In this test, the force required to overcome any layer/film adhesive forces during unwinding is determined.

For this purpose, the tape to be tested was made up in a compact cassette (Type C 90), wound under a defined torque and stored for 8 hours at 85° C., and the resulting adhesive forces were then measured without braking. The maximum retaining force (stated in cN) occurring in the immediate vicinity of the hub served as a comparative value in each case.

Test 2
Wow+flutter after storage at elevated temperatures

Compact cassettes having poor running properties tend to exhibit increased Wow+flutter after storage at elevated temperatures. The first playback after storage at elevated temperatures is particularly critical. The Wow +flutter behavior according to IEC 386, a measure of the speed fluctuations, was measured (modulation [%] is stated).

Test 3

Eluate value

The eluate value was determined in mg/l, according to DIN 38 414, page 4.

Test 4

Suitability for use in tropical climates

Testing of the abrasion resistance of test tapes with regard to deposits on the recording/playback head (RPH) and capstan after storage, and testing in a humid warm climate. Determination of the blocking rate.

Storage conditions

Storage time: 4 weeks
Storage conditions: 40° C., 93% relative humidity
Test specimens: 10 units of C 60, C 90 or C 120

Test conditions

Tester: Use of 10 drives, each having a recording/playback head with MU metal head mirror
Tape speed: 9.5 cm/sec
Test specimens: The cassettes stored under the conditions described above
Test time: 10 cassette cycles
Test conditions: 30° C., 93% relative humidity, acclimatization under test conditions for at least 8 hours The compact cassettes removed from storage under test conditions were operated in the playback mode on the tester. After the end of the cycle, the compact cassette was turned over and restarted. This process was repeated up to the 10th cycle, and the individual compact cassettes always remained in the same tester.

The deposits on the recording/playback head and capstan were rated separately, in each case after the first and tenth cycles (ratings 1 to 6, 1 meaning no abrasion and 6 meaning pronounced abrasion).

Test 5

Hydrophobic character

The contact angle was determined as a measure of the hydrophobic character of the magnetic layer.

The contact angle was determined according to A. W. Neumann, R. J. Good and J. S. Surf, Colloid Sci. Vol. 11, page 31, Plenum Press New York, 1979.

Measuring liquid: distilled $H_2O$

TABLE 1

| Tapes according to Example | Test 1 Take-off force [cN] | Test 2 Modulation [%] | Test 3 (mg of Cr/l) | Test 4 RPH/capstan | Test 5 Contact angle [°] |
|---|---|---|---|---|---|
| B6 | 0.9 | 1.2 | 0.1 | 2.0/2.0 | 95 |
| V3 | 1.5 | 4.6 | 0.8 | 3.0/2.5 | 110 |
| B7 | 0.8 | 0.9 | — | 1.5/2.0 | 91 |
| V4 | 1.5 | 3.9 | — | 2.5/3.5 | 109 |
| B8 | 0.8 | 1.0 | 0.1 | 2.0/2.0 | 96 |
| V5 | 1.8 | 4.9 | 1.0 | 3.5/3.0 | 107 |
| B9 | 0.7 | 0.8 | 0.05 | 2.0/2.0 | 99 |
| B6a | 1.2 | 1.9 | 0.2 | 2.4/2.2 | 97 |

TABLE 2

| Example | | SL [ΔdB] | SS [ΔdB] | OL [ΔdB] | OS [ΔdB] |
|---|---|---|---|---|---|
| B6 | Beginning of block | −0.9 | +0.1 | +0.5 | 0.0 |
|    | End of block | −0.8 | +0.3 | +0.7 | +0.1 |
| V6 | Beginninq of block | −1.2 | −0.2 | +0.3 | −0.2 |
|    | End of block | −0.7 | +1.1 | +0.9 | +1.3 |
| B8 | Beginning of block | −1.0 | −0.2 | +0.3 | 0.2 |
|    | End of block | −0.8 | −0.1 | +0.6 | 0.0 |
| B9 | Beginning of block | −0.8 | +0.3 | +0.8 | +0.4 |
|    | End of block | −0.9 | +0.6 | +1.0 | +0.5 |
| V8 | Beginning of block | 1.1 | −0.3 | −0.2 | −0.2 |
|    | End of block | +0.7 | +0.8 | −1.0 | +0.5 |

SL - Sensitivity at 315 KHz
SS - Sensitivity at 10 KHz
OL - Maximum output level at 315 KHz
OS - Maximum output level at 10 KHz
measured according to IEC II standard In the case of professional users, uniform values over the entire tape length are important so that the parameters of the recording and playback apparatuses can remain constant.

We claim:

1. A magnetic recording medium, comprising a nonmagnetic substrate and at least one magnetic layer which is applied firmly thereon and is based on a magnetic material finely dispersed in a binder comprising a material (I) suitable as a crosslinkable binder component for pigment-containing coatings and having an average molecular weight from 4000 to 30,000, obtained by reacting 1) a polyurethane (II) comprising
   a) 1 mol of a diol (III) having an average molecular weight of from 400 to 4000,
   b) from 0.3 to 9 mol of am aliphatic or cycloaliphatic diol (IV) of 2 to 18 carbon atoms,
   c) from 0.3 to 9 mol of an aromatic diol (V) of 8 to 30 carbon atoms,
   d) from 0.01 to 1 mol of a trihydric alcohol (VI) of 3 to 18 carbon atoms,
   e) from 0.001 to 1 mol of polyhydric alcohol (VII) of 3 to 40 carbon atoms which contains a tertiary amino group and
   f) an amount of a diisocyanate (VIII) of 6 to 30 carbon atoms such that the molar ratio of the isocyanate groups to the total number of hydroxyl groups in (III) to (VII) is from 1.05:1 to 1.4:1 with 2) a compound (IX) which contains one or more hydroxyl groups and one or more amino groups reactive toward isocyanate groups, the amount of (IX) being such that the number of reactive amino groups corresponds to the number of isocyanate groups in the polyurethane (II).

2. A magnetic recording medium as defined in claim 1, wherein the crosslinkable binder component is obtained from an amine of the formulae IXa to IXd as compounds (IX)

IXa 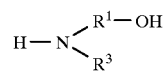

IXb 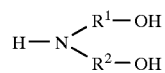

IXc 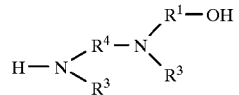

IXd 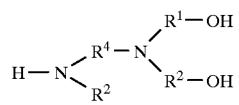

where $R^1$ and $R^2$ are each $C_1$–$C_{10}$-alkylene,
$R^3$ is hydrogen or $C_1$–$C_{11}$-alkyl,
$R^4$ is $C_1$–$C_{10}$-alkylene,

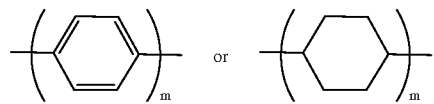 or 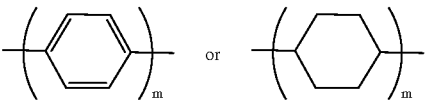

having from 0 to 2 $C_1$–$C_4$-alkyl radicals on the ring and m is from 1 to 5.

3. A process for the production of a magnetic recording medium coating, wherein a crosslinkable material as defined in claim 1, is applied, together with a polyvalent isocyanate (X), to a substrate and the crosslinking reaction of (I) and (X) is then carried out.

* * * * *

UNITED STATES PATENT AND TRADEMARK OFFICE
CERTIFICATE OF CORRECTION

PATENT NO.   : 5,922,469
DATED        : July 13, 1999
INVENTOR(S)  : Wuensch et al It is certified that error appears in the above-identified patent and that said Letters Patent is hereby corrected as shown below:

On the title page: Item [73] Assignee:

Emtec Magnetics GmbH,
Ludwigshafen, Germany--

UNITED STATES PATENT AND TRADEMARK OFFICE
CERTIFICATE OF CORRECTION

PATENT NO.: 5,922,469

DATED: July 13, 1999

INVENTOR(S): WUENSCH et al.

It is certified that error appears in the above-identified patent and that said Letters Patent is hereby corrected as shown below:

Col. 16, claim 1, line 35, delete "is based on" and substitute --comprises--.

Signed and Sealed this

Nineteenth Day of December, 2000

Attest:

Attesting Officer

Q. TODD DICKINSON

Commissioner of Patents and Trademarks